United States Patent [19]

Thomas

[11] Patent Number: 4,558,081
[45] Date of Patent: Dec. 10, 1985

[54] CARBONATE POLYMER CONTAINING AN IGNITION DEPRESSANT COMPOSITION

[75] Inventor: Lowell S. Thomas, Midland, Mich.

[73] Assignee: The Dow Chemical Company, Midland, Mich.

[21] Appl. No.: 665,222

[22] Filed: Oct. 26, 1984

Related U.S. Application Data

[63] Continuation-in-part of Ser. No. 471,597, Mar. 3, 1983, Pat. No. 4,486,560.

[51] Int. Cl.$^4$ .............................................. C08K 5/43
[52] U.S. Cl. ..................................... 524/100; 524/83; 524/168; 524/167; 524/159
[58] Field of Search ................. 524/168, 100, 83, 159, 524/167

[56] References Cited

U.S. PATENT DOCUMENTS

| | | | |
|---|---|---|---|
| 4,201,832 | 5/1980 | Hall | 424/412 |
| 4,208,489 | 6/1980 | Schmidt et al. | 524/99 |
| 4,223,100 | 9/1980 | Reinert | 524/161 |
| 4,254,015 | 3/1981 | Thomas et al. | 524/161 |
| 4,366,276 | 12/1982 | Freitag et al. | 524/130 |

*Primary Examiner*—Veronica P. Hoke

[57] ABSTRACT

A carbonate polymer such as a bisphenol-A homopolycarbonate containing a small amount of (1) a metal salt of an aromatic sulfonamide or a metal salt of an inorganic acid, such as a metal salt of a perhalometalate complex, (2) a halogenated organic compound and, (3) a melamine, exhibits improved flame retardant properties.

12 Claims, No Drawings

CARBONATE POLYMER CONTAINING AN IGNITION DEPRESSANT COMPOSITION

CROSS-REFERENCE TO RELATED APPLICATION

This is a continuation-in-part of U.S. patent application Ser. No. 471,597, filed Mar. 3, 1983 now U.S. Pat. No. 4,486,560.

BACKGROUND OF THE INVENTION

This invention relates to carbonate polymer compositions containing additives which act as flame retardants.

Carbonate polymers derived from reactions of dihydroxyorganic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance and excellent electrical properties are required.

Unfortunately, however, these polymers exhibit a brief but definite burning time when contacted with an open flame. More importantly, as is often the case, the carbonate polymers contain stabilizers and other additives which are often more combustible than the unmodified carbonate polymer. As a result, the modified carbonate polymers frequently exhibit substantially poorer resistance to combustion than does the unmodified carbonate polymer.

In attempts to increase the combustion resistance of carbonate polymers including the modified forms thereof, it has been a common practice to employ monomeric phosphites, phosphoric acid esters, thiophosphoric acid esters containing halogenated alkyl radicals and halogenated organic compounds into the carbonate polymer. However, in order to obtain any noticeable improvement in combustion resistance, these additives have been employed in such large quantities that they often adversely affect many of the desirable physical and mechanical properties of the carbonate polymer.

In view of the deficiencies of conventional fire retardant carbonate polymer compositions, it would be highly desirable to provide a carbonate polymer composition having improved resistance to burning when exposed to an ignition source.

SUMMARY OF THE INVENTION

The present invention is a carbonate polymer composition comprising a carbonate polymer having dispersed therein, in an amount sufficient to provide improved flame retardancy to said carbonate polymer composition, a fire retardant additive comprising (1) a metal salt of an aromatic sulfonamide and/or a metal salt of an inorganic acid, (2) a halogenated organic compound, and (3) a melamine compound. In another aspect, the present invention is a carbonate polymer composition comprising a carbonate polymer having blended therewith, in an amount sufficient to provide improved flame retardancy to said carbonate polymer, a fire retardant additive comprising (1) a metal salt of an aromatic sulfonamide and/or a metal salt of an inorganic acid, (2) a halogenated organic compound and (3) a melamine compound. Hereinafter, such compositions will be referred to as fire retardant carbonate polymer compositions. The fire retardant carbonate polymer compositions of the present invention exhibit surprisingly high resistance to combustion. In addition, said compositions exhibit physical properties comparable to a carbonate polymer containing no fire retardant additive.

The fire retardant carbonate polymer compositions of the present invention are suitably employed in most applications in which polycarbonates have been previously utilized. Applications of particular interest for the utilization of the said carbonate polymer compositions of this invention are as follows: automobile parts, e.g., air filters, fan housings, exterior components, housings for electrical motors, appliances, business and office equipment, and photographic equipment, lighting and aircraft applications.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)-alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The salt form of aromatic sulfonamides which are employed herein advantageously have at least one radical represented by the formula:

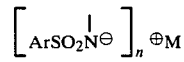

wherein Ar is an aromatic group, M is a suitable cation such as a metal cation and n is a number corresponding to the valence of M. M is preferably an alkali metal. Alternatively, M is a divalent cation, preferably alkali earth or multivalent cation obtained from copper, aluminum, antimony, and the like. Representative preferred sulfonamide salts include the alkali metal salts of saccharin, N-(p-tolylsulfonyl)-p-toluenesulfonamide, N-(N'-benzylaminocarbonyl)-sulfanilamide, N-(phenylcarboxyl)-sulfanilamide, N-(2-pyrimidinyl)sulfanilamide, N-(2-thiazolyl)-sulfanilamide and other salts of the sulfonamides disclosed in U.S. Pat. No. 4,254,015, which is incorporated herein by reference. Combinations of the above-identified salts can also be employed.

Metal salts of inorganic acids which can include the metal salts of perhalometalate complexes are most preferably alkali metal salts which include, for example, trisodium hexafluoroaluminate, disodium hexafluorotitanate, disodium hexafluorozirconate, sodium pyrophosphate, sodium tetrafluoroborate, sodium hexafluorophosphate, sodium bisulfate, and sodium phosphate. Also preferred are the potassium form of the salts listed above. Calcium sulfate and aluminum sulfate can be employed. Combinations of the above-identified salts can also be employed. See U.S. Pat. Nos. 4,336,276 and 4,208,489.

The halogenated organic compound can be virtually any halogenated organic compound commonly used as a fire retardant additive. The preferred compounds are the halo-substituted aromatic compounds (halo is fluoro, chloro, or bromo). Suitable compounds include, for example, decabromo diphenyloxide, tris-(tribromophenoxy)triazine, decabromo diphenyl carbonate, a tetrafluoroethylene polymer, an oligomer or polymer of tetrabromobisphenol A, and a copolymer of bisphenol A/tetrabromobisphenol A. Combinations of the above-identified compounds can be employed. Examples of other suitable monomeric and polymeric halogenated compounds are disclosed in U.S. Pat. No. 4,263,201, which is incorporated herein by reference.

The melamine compounds of the present invention can be virtually any N-substituted melamine which is non-polymeric in nature, and is sufficiently pure in form and compatible with the carbonate polymer. Typical examples of melamine compounds have molecular weights of less than about 800. Examples of highly preferred melamines include monomeric melamine compounds such as cyanurotriamide and N-alkyl substituted melamines, hexa(methoxymethyl)melamine, hexa(ethoxymethyl)melamine, hexa(n-propoxymethyl)melamine, hexa(n-butoxymethyl)melamine, hexa(t-butoxymethyl)melamine, hexa(isobutoxymethyl)melamine, and the like. See, for example, those non-polymeric melamine compounds disclosed in U.S. Pat. No. 4,201,832 which is incorporated herein by reference.

The fire retardant additives of this invention can comprise any amount of the aforementioned components in an effective combination which will provide improved fire retardancy to the carbonate polymer. Most preferred additive combinations comprise from about 10 to about 35, preferably about 15 to about 25, weight percent of a salt of an aromatic sulfonamide or salt of an inorganic acid, from about 10 to 35, preferably about 15 to about 25, weight percent melamine, and from about 30 to about 80, preferably about 50 to about 70, weight percent halogenated organic compound, based on the total weight of the additive. Also preferred are those combinations comprising from about 15 to about 50, preferably about 20 to about 30, weight percent of a salt of an aromatic sulfonamide or salt of an inorganic acid, and from about 50 to about 85, preferably about 70 to about 80, weight percent halogenated organic compound, based on the total weight of the additive. It is also understood that the individual fire retardant additive components must be sufficiently heat stable and pure to survive processing temperatures common to carbonate polymers without causing severe molecular weight degradation of the carbonate polymer with which the component is blended.

The fire retardant carbonate polymer compositions of the present invention are suitably prepared by combining the carbonate polymer with an effective amount of fire retardant additive using any of a variety of blending procedures conventionally employed for incorporating additives into carbonate polymer resins. For example, dry particulates of the carbonate polymer and the fire retardant additive can be dry blended and the resulting dry blend extruded into the desired shape. By "effective amount" is meant that combination of the desired fire retardant additive components is sufficient to provide improved fire retardant character to the carbonate polymer with which it is blended.

While any amount of the fire retardant additive that imparts to the carbonate polymer an improved fire retardant is suitable, preferred amounts of the fire retardancy additive are in the range from about 0.001 to about 10, especially from about 0.005 to about 2, weight percent based on the weight of the carbonate polymer.

Fire retardant carbonate polymer compositions are considerably more difficult to ignite than unmodified carbonate polymer resins or carbonate polymer compositions containing only the individual fire retardant additive components. The fire retardant carbonate polymer compositions of this invention rapidly form a char at the surface of the sample once ignition is achieved. In addition, the compositions of this invention burn for a much shorter time than unmodified carbonate polymer resins or carbonate polymer compositions containing only the individual fire retardant additive components.

In addition to the aforementioned fire retardant additives, other additives can be included in the carbonate polymer composition of the present invention such as fillers (i.e., a tetrafluoroethylene polymer or glass fibers), pigments, dyes, antioxidants, stabilizers, ultraviolet light absorbers, mold release agents and other additives commonly employed in carbonate polymer compositions.

The following examples are given to further illustrate the invention and should not be construed as limiting its scope. In the following examples, all parts and percentages are by weight unless otherwise indicated.

EXAMPLE 1

Samples are prepared using a 3000-g portion of a bisphenol-A polycarbonate sold under the brand name Merlon M50F-1000 by Mobay Chemical Corporation, and a fire retardant additive comprising varying amounts of sodium N-(p-tolylsulfonyl)-p-toluenesulfonamide, decabromo diphenyloxide and hexamethoxy methyl melamine. The constituents are mixed using a Hobart brand mixer until thoroughly and evenly dispersed. The mixture is dried at 250° F. for 4 hours, and extruded on a single screw, 1¼ inch, 20:1 L/D extruder operated at a barrel temperature of 525° F. and a screw speed of 80 rpm. The extruded sample is redried at 250° F. for 4 hours. The pellets are molded into test specimens using a Newbury brand Model H1-30RS injection molding machine under the following conditions: barrel temperature=575° F., mold temperature=175° F., injection polymer pressure sufficient to fill the cavity. The molded bars are tested for combustibility (oxygen index and fire resistance). Data is presented in Table I.

TABLE I

| Sample | Amount NPTSM[1] | Amount DBDPO[2] | Amount HMMM[3] | Total Amount[4] | Fire Retardance[5] Avg. After Burn Time | Rating | Oxygen Index[6] |
|---|---|---|---|---|---|---|---|
| C-1* | — | — | — | — | 29.3 | HB, HB | 25.2 |
| C-2* | 0.1 | — | — | 0.1 | 2.1 | V-O, V-O | 39.9 |
| C-3* | 1.0 | — | — | 1.0 | 6.0 | V-1, V-1 | 29.2 |
| C-4* | — | 0.1 | — | 0.1 | 14.3 | HB, HB | 26.6 |
| C-5* | — | 1.0 | — | 1.0 | 12.7 | V-2, V-2 | 28.6 |
| C-6* | — | — | 0.1 | 0.1 | — | V-2, V-2 | 29.6 |
| C-7* | — | — | 1.0 | 1.0 | — | V-2, V-2 | 30.6 |
| S$_1$ | 0.02 | 0.08 | — | 0.1 | 2.6 | V-O, V-O | 39.0 |
| S$_2$ | 0.2 | 0.8 | — | 1.0 | 1.2 | V-O, V-O | 44.9 |
| S$_3$ | 0.02 | 0.06 | 0.02 | 0.1 | 2.7 | V-O, V-O | 40.3 |
| S$_4$ | 0.05 | 0.15 | 0.05 | 0.25 | 0.9 | V-O, V-O | 41.0 |
| S$_5$ | 0.10 | 0.30 | 0.10 | 0.5 | 0.8 | V-O, V-O | 43.6 |
| S$_6$ | 0.20 | 0.60 | 0.20 | 1.0 | 0.5 | V-O, V-O | 46.0 |
| S$_7$ | 0.40 | 1.20 | 0.40 | 2.0 | 0.5 | V-O, V-O | 48.0 |

*Not an example of the invention.
[1]NPTSM is the sodium salt of N—(p-tolylsulfonyl)-p-toluenesulfonamide.
[2]DBDPO is decabromo diphenyl oxide.
[3]HMMM is hexamethoxy methyl melamine.
[4]Amount is weight percent based on carbonate polymer.
[5]Subject to the test procedure set forth in Underwriters' Laboratories, Inc. Bulletin UL-94, Burning Test for classifying materials. Samples are ⅛ inch and two, five bar sets of samples are tested.
[6]Method is ASTM D-2863-70.

EXAMPLE 2

Samples are prepared and tested as in Example 1. The molded bars are tested for combustibility. Data is presented in Table II.

TABLE II

| Sample | Amount NPTSM | Amount TTBPT[1] | Amount K$_2$TiF$_6$[2] | Amount DBDPO | Amount DBDPC[3] | Total Amount | Fire Retardance[4] Avg. After Burn Time | Rating | Oxygen Index[5] |
|---|---|---|---|---|---|---|---|---|---|
| C-1* | — | — | — | — | — | — | 29.3 | HB, HB | 25.2 |
| S$_8$ | 0.02 | 0.08 | — | — | — | 0.1 | 2.8 | V-O, V-O | 39.6 |
| S$_9$ | 0.20 | 0.80 | — | — | — | 1.0 | 1.6 | V-O, V-O | 45.4 |
| S$_{10}$ | 0.02 | — | — | — | 0.08 | 0.1 | 2.1 | V-O, V-O | 38.9 |
| S$_{11}$ | 0.2 | — | — | — | 0.8 | 1.0 | 0.9 | V-O, V-O | 43.9 |
| S$_{12}$ | — | — | 0.02 | 0.08 | — | 0.1 | 3.0 | V-O, V-O | 38.1 |
| S$_{13}$ | — | — | 0.2 | 0.8 | — | 1.0 | 1.1 | V-O, V-O | 41.7 |

*Not an example of the invention.
[1]TTBPT is tri-(2,4,6-tribromophenoxy)triazine.
[2]K$_2$TiF$_6$ is dipotassium hexafluorotitanate.
[3]DBDPC is decabromodiphenyl carbonate.
[4]See Table I.
[5]See Table I.

As evidenced by the data shown in Tables I and II, the fire retardant additives, when blended with the polycarbonate in amounts within the scope of this invention, provide substantial improvement in that the compositions exhibit a reduced tendency to burn.

What is claimed is:

1. A carbonate polymer composition comprising a carbonate polymer having dispersed therein, in an amount sufficient to provide improved flame retardancy to said carbonate polymer, a fire retardant additive comprising (1) a metal salt of an aromatic sulfonamide and/or a metal salt of an inorganic acid wherein said metal salt of an aromatic sulfonamide contains at least one radical represented by the formula:

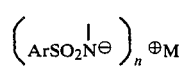

wherein Ar is an aromatic group, M is a metal cation and n is a number corresponding to the valence of M, (2) a halogenated organic compound and (3) a non-polymeric melamine compound.

2. A composition of claim 1 wherein said metal salt of an inorganic acid is a sodium or potassium phosphate or bisulfate.

3. A composition of claim 1 wherein said fire retardant additive comprises from about 10 to about 35 weight percent inorganic acid salt, from about 10 to about 35 weight percent melamine compound, and from about 30 to about 80 weight percent halogenated organic compound, based on the total weight of the additive.

4. A composition of claim 1 wherein said metal salt of an inorganic acid is a metal salt of a perhalometalate complex.

5. A composition of claim 4 wherein said metal salt of a perhalometalate complex is a sodium or potassium hexafluoroaluminate, hexafluorotitanate, hexafluorozirconate, and hexafluorophosphate.

6. A composition of claim 4 wherein said fire retardant additive comprises from about 10 to about 35 weight percent perhalometalate complex, from about 10 to about 35 weight percent melamine compound, and from about 30 to about 80 weight percent halogenated organic compound, based on the total weight of the additive.

7. A composition of claim 1 wherein said fire retardant additive comprises from about 10 to about 35 weight percent aromatic sulfonamide salt, from about 10 to about 35 weight percent melamine compound, and from about 30 to about 80 weight percent halogenated organic compound, based on the total weight of the additive.

8. A composition of claim 1 wherein said fire retardant additive comprises from about 15 to about 25 weight percent aromatic sulfonamide salt, from about 15 to about 2weight percent melamine compound, and from about 50 to about 70 weight percent halogenated organic compound, based on the total weight of the additive.

9. A composition of claim 1 wherein the carbonate polymer is a polycarbonate of bisphenol-A, and the fire retardant additive comprises (1) the sodium or potassium salt of N-(p-tolylsulfonyl)-p-toluenesulfonamide, (2) decabromo diphenyl oxide, and (3) hexamethoxy methyl melamine.

10. A composition of claim 1 wherein said fire retardant additive is present in an amount from about 0.001 to about 10 weight percent based on the weight of the carbonate polymer.

11. A composition of claim 1 wherein said fire retardant additive is present in an amount from about 0.05 to about 2 weight percent based on the weight of the carbonate polymer.

12. A composition of claim 1 wherein said melamine is hexamethoxy methyl melamine.

* * * * *

UNITED STATES PATENT AND TRADEMARK OFFICE
CERTIFICATE OF CORRECTION

PATENT NO. : 4,558,081
DATED : December 10, 1985
INVENTOR(S) : Lowell S. Thomas

It is certified that error appears in the above—identified patent and that said Letters Patent is hereby corrected as shown below:

In Col. 3, line 53, after "about 10 to", please insert --about--.

In Col. 4, line 18, "retardant", should read --retardancy--.

In Col. 4, line 19, "retardancy", should read --retardant--.

In Col. 7, line 6, "2weight", should read --25 weight--.

Signed and Sealed this

Twenty-fourth Day of June 1986

[SEAL]

Attest:

DONALD J. QUIGG

Attesting Officer

Commissioner of Patents and Trademarks